United States Patent [19]

Posso

[11] Patent Number: 5,005,708
[45] Date of Patent: Apr. 9, 1991

[54] SUPPORT FOR COMPACT DISK BOXES

[75] Inventor: Patrick P. P. Posso, Renens, Switzerland

[73] Assignee: Gefitec S.A., Lausanne, Switzerland

[21] Appl. No.: 398,656

[22] Filed: Aug. 25, 1989

[30] Foreign Application Priority Data

Sep. 9, 1988 [FR] France ................................ 88 11799

[51] Int. Cl.⁵ .............................................. A47G 29/00
[52] U.S. Cl. .......................................... 211/41; 312/10
[58] Field of Search ............................ 211/41, 71, 40; 248/176; 312/9, 10, 8; 206/387

[56] References Cited

U.S. PATENT DOCUMENTS

| 3,897,871 | 8/1975 | Zinnbauer | 211/41 X |
| 4,440,458 | 4/1984 | Berkman | 312/10 X |
| 4,453,785 | 6/1984 | Smith | 312/10 |
| 4,595,098 | 6/1986 | Kryter | 312/9 X |
| 4,629,067 | 12/1986 | Pavlik et al. | 211/41 X |
| 4,781,423 | 11/1988 | Muenzer et al. | 211/41 X |
| 4,782,949 | 11/1988 | Berkman | 312/10 X |

Primary Examiner—Sarah A. Lechok
Attorney, Agent, or Firm—Kane, Dalsimer, Sullivan, Kurucz, Levy, Eisele and Richard

[57] ABSTRACT

Support for standard boxes of compact disks in the form of a tray provided with transverse vertical walls spaced at a distance greater than the thickness of a box in such a way that the boxes are able to occupy two stable oblique positions. The tray has two raised lateral parts spaced at a distance of between the width and the length of a box and one transverse wall out of two extends only over the width of the raised part, in such a way that the single boxes may be placed on their big side on the raised parts, while the double boxes may be placed between the raised parts on the bottom of the tray.

2 Claims, 2 Drawing Sheets

SUPPORT FOR COMPACT DISK BOXES

FIELD OF THE INVENTION

The present invention relates to a support for compact disk boxes in the form of a rectangular tray with a width corresponding to the largest dimension of the boxes, this tray having, on its big sides, two vertical walls between which extend the parallel vertical transverse walls with a height of about 1 to 2 cm and spaced relative to each other at a distance greater than the thickness of a box, in such a way that a box placed vertically between two transverse walls is able to tilt slightly to one side or the other resting alternately against the upper edge of one of the transverse walls.

PRIOR ART

The possibility of being able to tilt the boxes slightly allows them to be "flicked through" in order to consult them or search for a box in a set. In a known support of this kind, the boxes are moreover supported by a rib of limited height extending between the transverse walls. Such a support, however, is able to receive only one type of box, in principle boxes containing a single compact disk.

SUMMARY OF THE INVENTION

The object of the present invention is to provide a support enabling both single boxes and double boxes to be received.

Starting with the observation that, on the one hand, the boxes are not square and that, on the other hand, the thickness of a double box is greater than double the thickness of a single box, the support according to the invention is defined in that the bottom of the tray is raised along its long sides, the distance between these two raised parts being greater than the small dimension of a box and in that the said tray has two kinds of transverse walls appearing alternately, the transverse walls of the first kind extending over all or part of the width of the tray, while the transverse walls of the second kind extend over only the raised parts of the bottom.

The tray according to the invention is able to receive single boxes resting via their long sides on the raised part of the tray or double boxes resting via their small sides on the bottom of the tray, between the raised parts of the latter.

The fact that the thickness of the double boxes is greater than double the thickness of the single boxes means that the same inclination may be obtained for the double boxes and single boxes and consequently that single boxes and double boxes may be arranged on the same support and that single and double boxes may even be mixed.

The accompanying drawing shows, by way of example, an embodiment of the invention and a variation of the latter.

DESCRIPTION OF THE PREFERRED EMBODIMENTS

Figure 1:
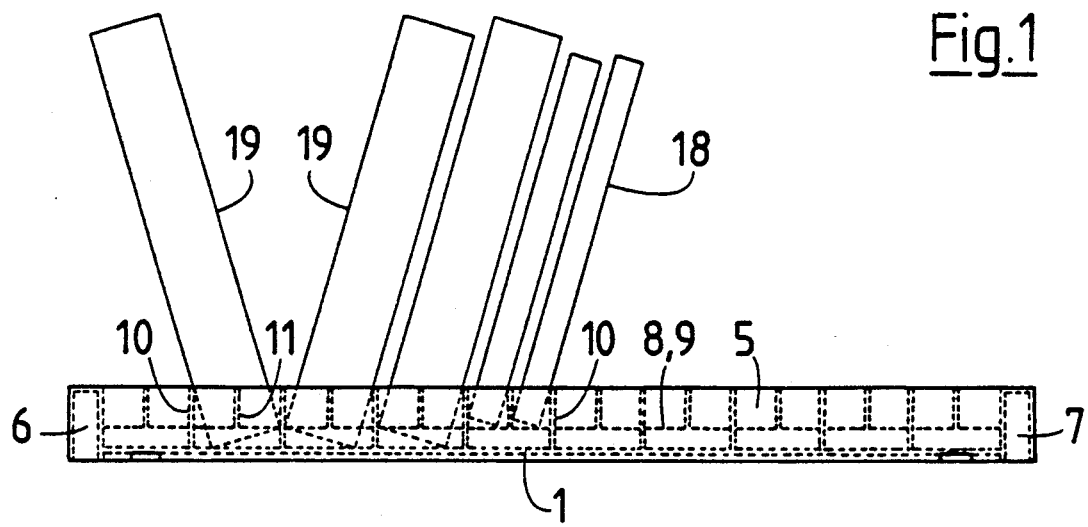
FIG. 1 is a side elevation view of the support.
Figure 3:
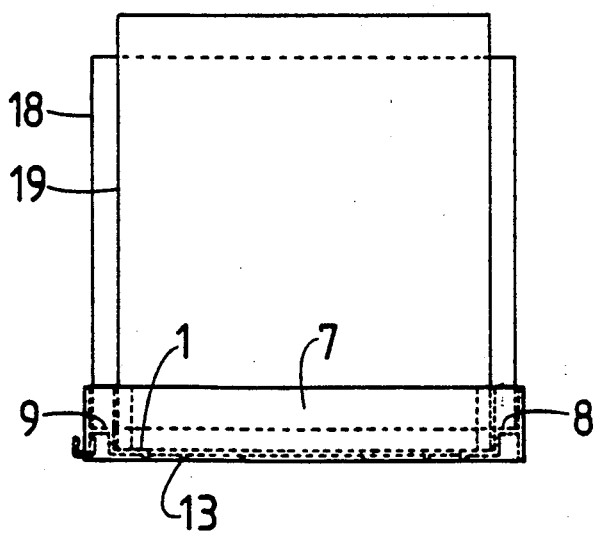
FIG. 3 is a front view of the support.

The support shown in FIGS. 1 and 3 is in the form of a rectangular tray, the bottom 1 of which is substantially perforated by large rectangular cut-outs 2 and 3. On its long sides, the tray is limited by two vertical walls 4 and 5. The small sides of the tray consist of two parts 6 and 7 profiled in a U shape with a height equal to the walls 4 and 5. The distance between the wall 4 and 5 is slightly greater than the largest side of a standard box. Along these walls 4 and 5, the bottom has two raised parts 8 and 9 forming a step of intermediate height between the bottom 1 and the upper edge of the walls 4 and 5. The distance separating the raised parts 8 and 9 is slightly greater than the small dimension, i.e. the width of a standard box. Between the walls 4 and 5 there extend two kinds of equidistant transverse vertical walls 10 and 11 alternating with each other and separated from each other by a distance substantially greater than the thickness of a single box. In the example shown, this distance is equal to 14 mm. With the exception of the middle transverse wall, the walls of the first kind 10 extend only over a small part of the width of the tray. The transverse walls of the second kind 11 extend only over the width of the raised parts 8 and 9. In the example shown, the height of the walls 10 is 20 mm, whereas the height of the walls 11 is 13 mm above the raised parts 8 and 9. The underneath of the tray is reinforced by ribs such as 12 and 13 which ensure that it has an adequate degree of rigidity.

The ribs 10 and 11 define overall twenty recesses intended to receive twenty single boxes 18 placed inside these recesses on their big side. The distance between two transverse walls and the height of the walls 10 and 11 relative to the raised parts 8 and 9 are such that the single boxes 18 can assume an inclined position as shown in FIG. 1, on either side.

The transverse walls 10 define ten recesses intended to receive ten double boxes 19 placed on their small side on the bottom 1. The distance separating two consecutive walls 10, determined by the distance between the walls 10 and 11 and the thickness of the walls 11, relative to the height of the walls 10, is such that the double boxes 19 may assume an oblique position parallel to that of the single boxes 18, on either side.

Figure 2:
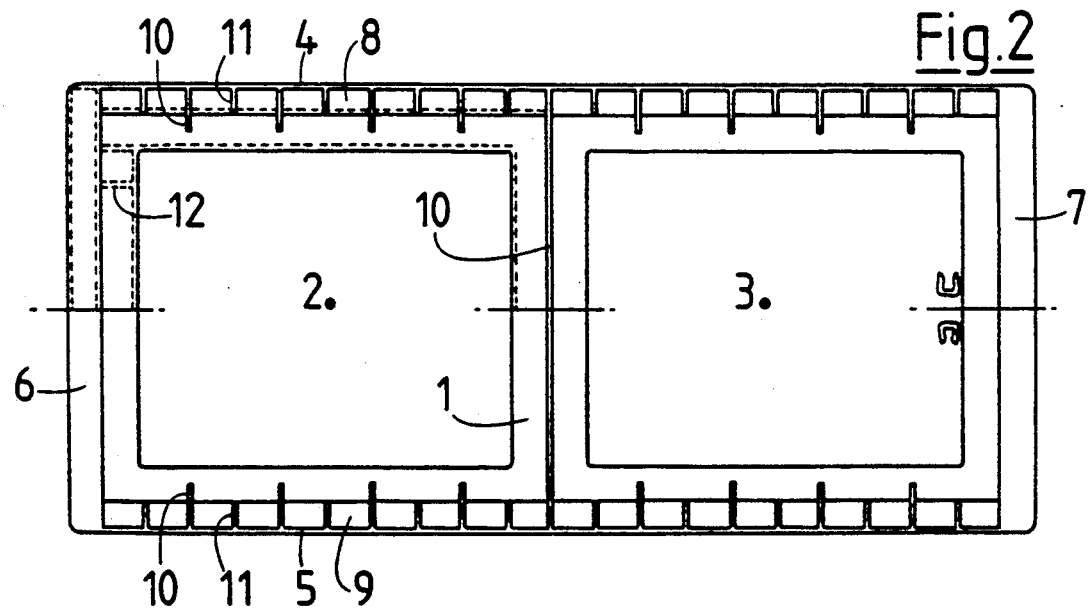
FIG. 2 is a plan view from above.

The tray is thus able to receive ten double boxes or twenty single boxes or a mixture of double boxes and single boxes as shown in FIGS. 1 to 3. These boxes may be "flicked through", i.e. tilted from one stable position to the other stable position so that they can be consulted. On the support, the double boxes 19 are higher than the single boxes 18.

Since the bottom of the recesses receiving the boxes is flat, the boxes, when tilted, pass through a vertical position where they are resting on their bottom edge, which produces a jerky movement. The boxes may even incidentally remain in the vertical position.

Figure 4:
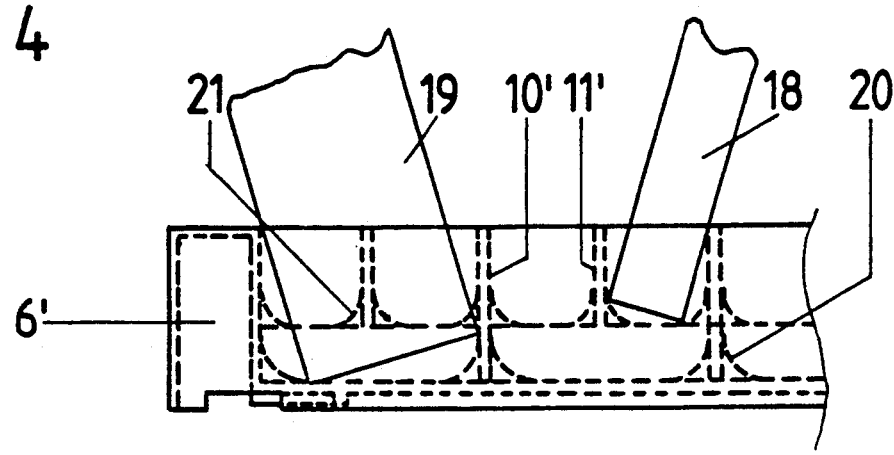
FIG. 4 is a partial side view of a variation of embodiment.
Figure 5:
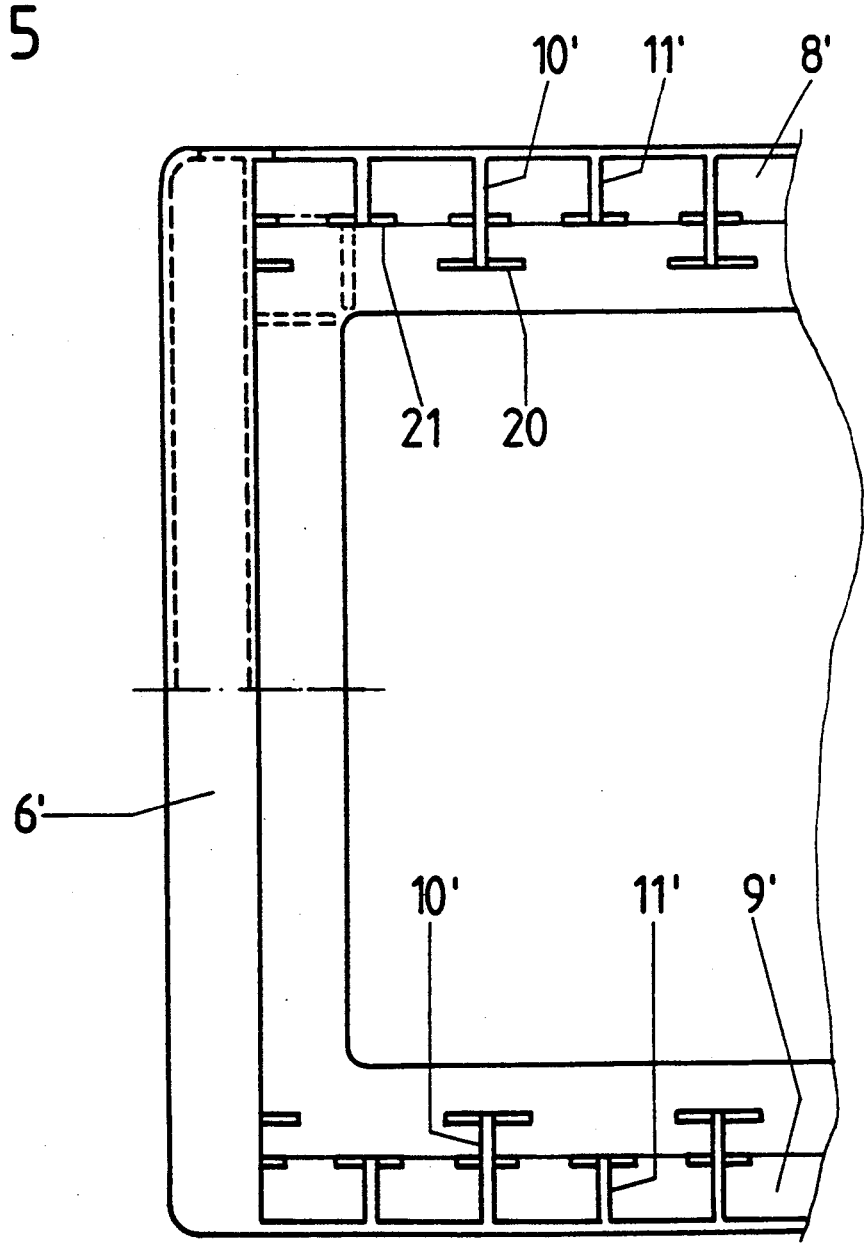
FIG. 5 is a partial plan view of this variation.

It is possible to obtain a continuous and smoother movement by means of additional ribs as shown in FIGS. 4 and 5.

Perpendicularly to the transverse walls 10' and 11', corresponding to the walls 10 and 11 of FIGS. 1 to 3, there have been provided ribs 20 and 21 whose edges in the shape of an arc of a circle extend between the transverse walls and the bottom 1', respectively the raised parts 8' and 9', in such a way that the boxes move along these circle arcs during tilting of the boxes, and more precisely from one end to the other of these circle arcs, as can be seen in FIG. 4 in the case of the double boxes 19. Tilting is thus performed in a continuous manner without jerkiness.

The invention is of course not limited to the embodiments shown. The bottom 1 could be continuous. The transverse walls 10 could extend over the entire width of the tray. The distance between the transverse walls could be less than or greater than the distance appearing in the drawing. The inclination assumed by the boxes could be modified by providing the upper edges of the transverse walls with a flange.

I claim:

1. A rectangular support tray for compact disk boxes having long sides and short sides forming a rectangular plane, and having a width dimension extending perpendicular to the rectangular plane, the rectangular tray being formed of long sides and short sides forming a rectangular plane and also formed of a vertical dimension extending perpendicular to the rectangular plane of the tray, and a bottom of the tray, the length of the short side of the tray substantially corresponding to the length of the long side of the compact disk box, continuous raised portions adjoin the interiors of each of the long sides of the tray, the distance between the continuous raised portions as measured parallel to the short side of the rectangular tray being greater than the length of the short side of the compact disk box and shorter than the length of the long side of a compact disk box, the tray also being provided with a plurality of vertical transverse walls extending along the interior long sides of the tray and perpendicular thereto, said vertical transverse walls having a height of approximately 1 to 2 cm, said vertical transverse walls being of a first length and a second length, said first length transverse walls extending in the direction perpendicular to the long side of the tray upon only the continuous raised portion of the long side of the tray and the second length transverse walls extending for a length beyond the continuous raised portion of the long side of the tray, said vertical transverse walls being spaced along the long side of the tray so that a compact disk box placed upon its width dimension between two said vertical transverse walls will stand vertically and tilt slightly, with said compact disk box resting against the vertical transverse walls.

2. The rectangular support tray as set forth in claim 1, further comprised of ribs, said ribs being in the shape of an arc of a circle and being placed, respectively, at the point where the bottom of the first length transverse walls adjoin the bottom of the continuous raised portions and the point where the bottom of the second length transverse walls adjoin the bottom of the tray so that when the compact disk box is positioned between said vertical transverse walls and tilted, the edge of the box traverses the ribs thereby facilitating tilting.

* * * * *